(12) United States Patent
Craft

(10) Patent No.: US 8,876,141 B1
(45) Date of Patent: Nov. 4, 2014

(54) SELF-TRACKING VEHICLE TRAILER

(71) Applicant: Richard D. Craft, Marshallville, GA (US)

(72) Inventor: Richard D. Craft, Marshallville, GA (US)

( * ) Notice: Subject to any disclaimer, the term of this patent is extended or adjusted under 35 U.S.C. 154(b) by 69 days.

(21) Appl. No.: 13/804,114

(22) Filed: Mar. 14, 2013

(51) Int. Cl.
*B60D 1/00* (2006.01)
*B62D 13/04* (2006.01)

(52) U.S. Cl.
CPC ........................ *B62D 13/04* (2013.01)
USPC .......................................... 280/492

(58) Field of Classification Search
USPC ................................. 280/492, 494
See application file for complete search history.

(56) References Cited

U.S. PATENT DOCUMENTS

| | | | |
|---|---|---|---|
| 2,447,250 A * | 8/1948 | Holloway | ............ 280/494 |
| 2,475,174 A | 7/1949 | Boone | |
| 3,998,474 A * | 12/1976 | Marker et al. | ............ 280/618 |
| 4,125,272 A | 11/1978 | Putnam, Jr. et al. | |
| 4,664,403 A | 5/1987 | Livingston | |
| 5,664,796 A | 9/1997 | Huyzers | |
| 6,626,449 B2 | 9/2003 | Hazen | |
| 6,991,246 B1 | 1/2006 | McCalip | |
| 8,505,952 B1 * | 8/2013 | Choquette | ............ 280/491.2 |

* cited by examiner

*Primary Examiner* — Tony Winner
(74) *Attorney, Agent, or Firm* — Cort Flint; Thomas L. Moses; Southeast IP Group LLC

(57) ABSTRACT

A self-tracking trailer is disclosed for towing by a vehicle which tracks the movement of the vehicle for ease of maneuvering comprising a trailer frame having a front frame member extending generally transverse to a longitudinal axis of said trailer. A vehicle trailer hitch assembly includes a pivotal cross-bar carried by said front frame member; a trailer hitch tongue carried by the cross-bar insertable into a vehicle hitch receiver affixed to the vehicle. The cross-bar is pivotally carried by said front frame member for rotation about a pitch axis. A swivel connector is disposed between said pivotal cross-bar and said vehicle providing rotation about a trailer roll axis.

12 Claims, 4 Drawing Sheets

SELF-TRACKING VEHICLE TRAILER

BACKGROUND OF THE INVENTION

The invention relates to a small utility trailer having casters for use by an individual whom may not be experienced at towing or backing a trailer. The trailer automatically tracks movement of the vehicle so that the trailer and vehicle move as one piece, which is particularly useful when backing the trailer.

Prior art trailers have been known which use casters in different constructions and arrangements for different uses requiring different hitch assemblies. U.S. Pat. No. 4,664,403 discloses a hitch adapter for a double caster wheel trailer having a rather complicated and expensive construction requiring many parts. The trailer hitch requires two conventional ball couplings. U.S. Pat. No. 5,664,796 discloses a vehicle extender for a single caster trailer and the extender allows the caster to easily rotate to a forward movement position even under a heavy load. U.S. Pat. No. 6,626,449 discloses a trailer having double casters wherein the casters are lockable to follow the vehicle in either a forward or rearward position. Not only does the hitch construction require two ball couplers carried by the trailer, but requires a special hitch structure carried by the automobile. U.S. Pat. No. 6,991,246 discloses a trailer hitch assembly for a coupling use with a tractor vehicle wherein the hitch allows pitch rotation. However, the hitch assembly includes coupling elements on the trailer for fixedly engaging the trailer to a towing vehicle. The hitch assembly pivotally links the trailer to the vehicle in a horizontal plane during a forward motion of the vehicle and the trailer.

Thus, an object of the invention is to provide a vehicle trailer and hitch assembly that even an inexperienced driver may comfortably use, particularly when backing up with the tow vehicle.

Another object of the present invention is to provide a vehicle tracking trailer and hitch which is simple in construction and inexpensive to fabricate.

SUMMARY OF THE INVENTION

The above objectives are accomplished according to the present invention by providing a self-tracking trailer that follows the track of the tow vehicle automatically and includes a hitch assembly and casters which is easily maneuvered. The trailer uniquely requires the trailer to track the vehicle when backing up. More particularly, the trailer comprises a trailer frame, and a vehicle trailer hitch assembly that includes a pivotal cross-bar, a trailer hitch tongue carried by the cross-bar which swivels relative to the cross-bar, and a vehicle receiver hitch in which the hitch tongue is inserted and fixed. A front frame member of the trailer frame extends transversely to a longitudinal axis of the trailer and parallel to the cross-bar. The cross-bar is pivotally carried by the front frame member and extends parallel to the front frame member, between the frame member and the trailer hitch tongue when hitched. The hitch tongue is swivelably carried by the cross-bar and receivable in the vehicle hitch receiver in a manner that the hitch receiver and hitch tongue are fixed against rotation and movement relative to each other during use. A swivel connector connects the trailer hitch tongue and the cross-bar to provide rotation of the trailer about a horizontal roll axis, perpendicular to the longitudinal axis of the trailer, but does not allow rotation about a vertical yaw axis in use. A pivot connection is disposed between the front frame member and the cross-bar providing rotation about a pitch axis perpendicular to the roll axis. A pair of casters is carried adjacent a rear portion of the trailer rotatable about horizontal and vertical axes. When the trailer is hitched to the vehicle by means of the pivotal cross-bar, the vehicle hitch receiver, and the trailer hitch tongue, rotational movement of the trailer relative to the vehicle is limited to two degrees of freedom, pitch and roll whereby the casters follow the trailer and vehicle. Advantageously, the hitch receiver and the hitch tongue have a rectangular cross-section to provide a rigid connection. A pivot connection may include a pivot arm carried between the cross-bar and the front frame member at opposite sides of the trailer frame, one end of the pivot arm is pivotally attached to one of the front frame member and the cross-bar, and the other end of the arm is affixed to the other one of front frame members and cross-bar. Preferably, the cross-bar is tubular and the swivel includes a first connector member fixed with cross-bar, a second connector member fixed with the trailer hitch tongue, and a bearing carried between the first and second connector members about which the vehicle receiver hitch and cross-bar swivel in a vertical plane. The trailer includes at least a second frame member carried adjacent a rear portion of the trailer frame which extends transverse to the longitudinal trailer axis. The casters are carried on opposing sides of the trailer frame adjacent the second frame member. A shock absorber is carried between each caster and the trailer frame. Preferably a mounting flange is affixed to the second frame member and a side frame member of the frame by which the casters are attached to the trailer.

DESCRIPTION OF THE DRAWINGS

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
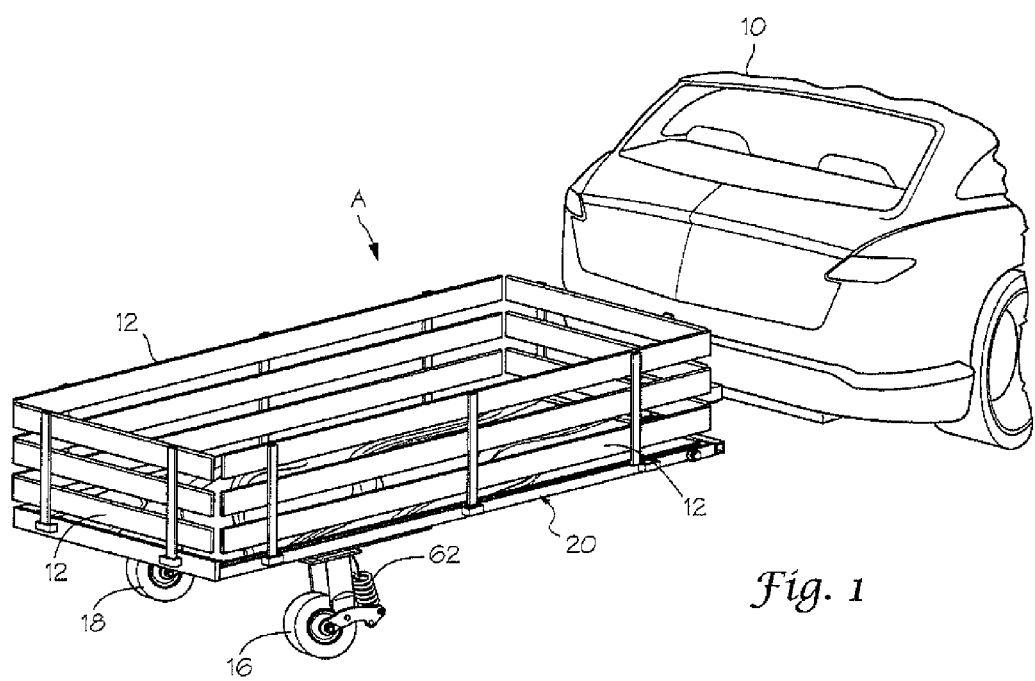
FIG. 1 is a perspective view showing a self-tracking trailer according to the invention attached to a vehicle.

The invention will now be described in more detail by referring to the drawings described above.

Figure 2:
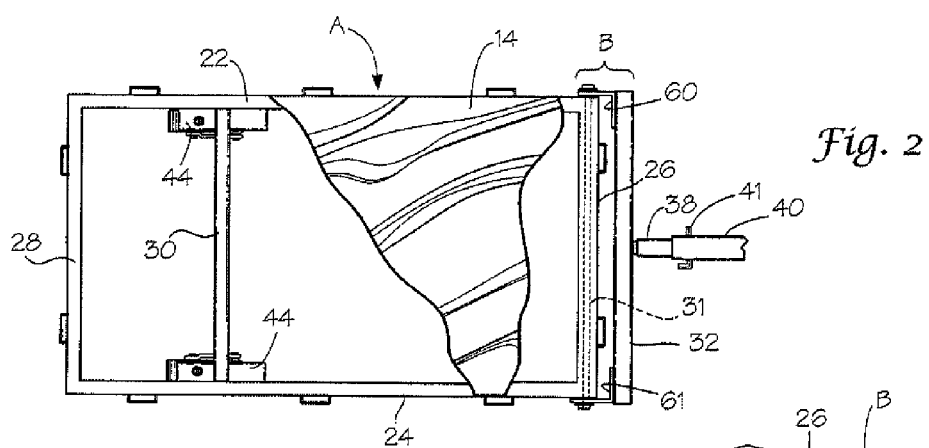
FIG. 2 is a top plan view of the trailer of FIG. 1 with part of the floor cutaway.
Figure 3:
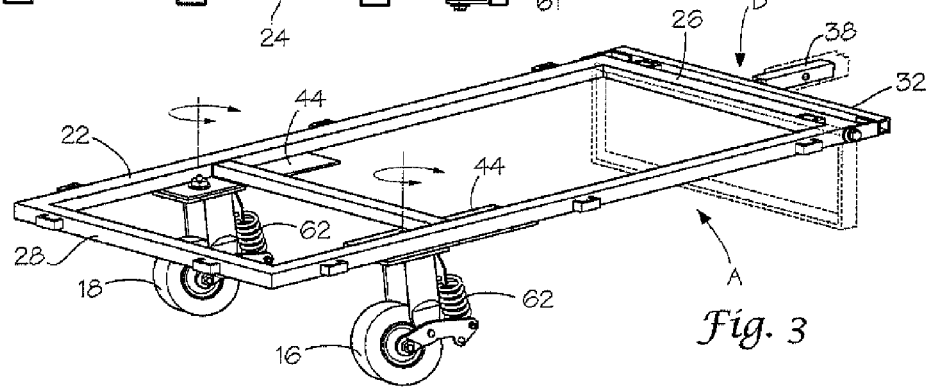
FIG. 3 is a perspective view of the self-tracking trailer of FIG. 2.
Figure 7:
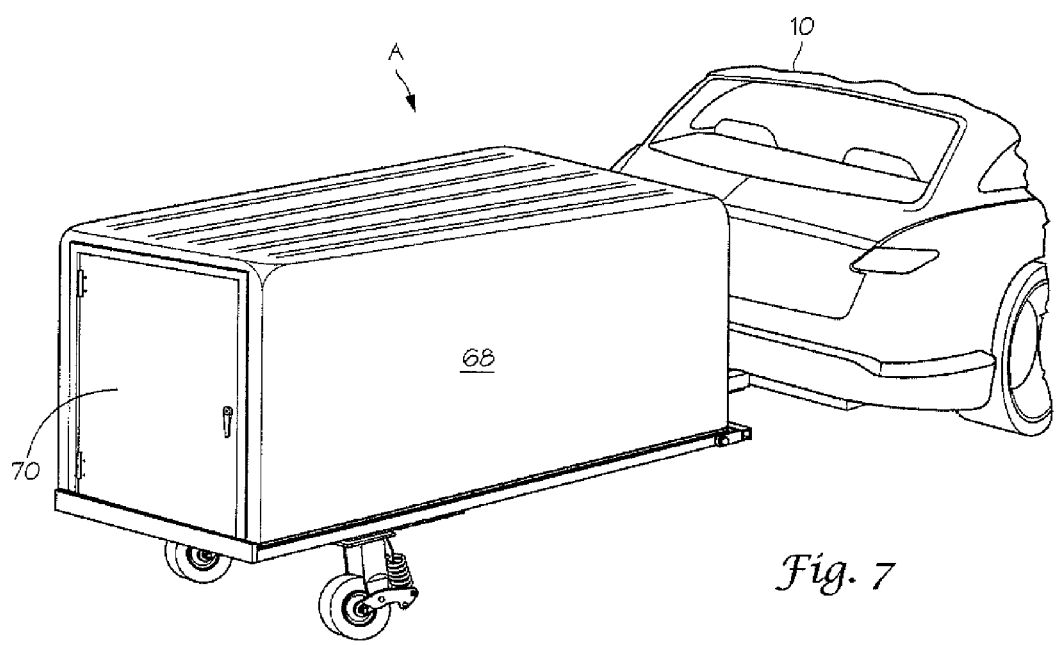
FIG. 7 is a perspective view of the trailer of FIG. 1 with a card cover and door.

As best can be seen in FIG. 1, a self-tracking vehicle trailer, designated generally as A, is illustrated wherein the trailer is hitched to vehicle 10. As illustrated, the trailer may include removable sides 12 and a floor 14. A pair of casters 16 and 18 are carried by a trailer frame 20. As best can be seen in FIGS. 2 and 3, trailer frame 20 includes longitudinal side frame members 22 and 24, together with integral front and back frame members 26 and 28 in a rectangular configuration. An intermediate transverse frame member 30 is located adjacent to the attachment area of the casters. Mounting flanges 44 are affixed to the side frame members and the intermediate frame member. The casters are then affixed to the mounting flanges. The trailer may be made integral by any suitable means such as welding. Floor 14 may be any suitable flooring such as treated wood, metal, etc. FIG. 7 illustrates a trailer A according to the invention including a hard cover 68 and a door 70.

As can best be seen in FIG. 2, a hitch assembly for trailer A includes a cross-bar 32 extending generally parallel to front frame member 26 and connected to the front frame member by means of a pivot connection 35. The pivot connection includes first arm 32 and 34 affixed to either the cross-bar or frame member while being pivotally attached to the other. The pivot connection may include a pivot rod 31 as shown, or other suitable pivot arrangement using bolts, pivot pins, etc. A swivel connection 36 connects the cross-bar to trailer hitch tongue 38 which is receivable in a vehicle hitch receiver 40 attached to the vehicle. FIG. 3 illustrates a perspective view of the trailer frame without floor 14 wherein the casters 16 and 18 are attached to mounting flanges 44 which are welded to side frame members 22 and 24 as well as to intermediate frame member 30. A pivotal stand shown in dotted lines may be used to stand the trailer up when needed.

Figure 4:
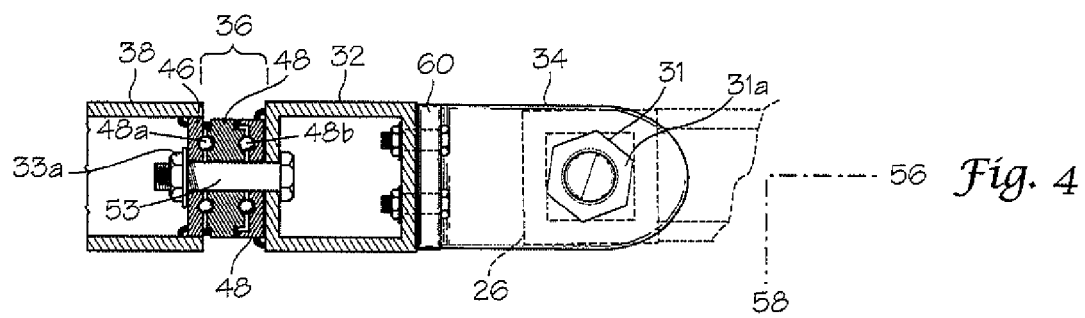
FIG. 4 is a sectional view illustrating a swivel connection between the trailer hitch tongue and a pivotal cross-bar carried by the trailer.

As can best be seen in FIG. 4, the swivel connection between cross-bar 32 and trailer hitch tongue 38 is shown at 36. In the illustrated embodiment the swivel connection includes a first connector member 46 affixed to cross-bar 32, and a second connector member 52 affixed to the trailer hitch tongue, and a bearing 48 carried between the connector member. Bearing 48 includes a first and second ball bearing race 48a and 48b carried between the connector members. Thus, the connector members 46 and 52, as well as cross-bar 32, and hitch tongue 38, are hitched to receiver 40. A bolt 53 has a treaded end engaged with a locking nut 53a. Bolt 53 is tightened so that the connector members are tightened against the ball bearings. First connector member 46 is free to swivel relative to second connector member 52 to provide a roll motion for the trailer about a roll axis 56. Trailer tongue 38 and vehicle hitch receiver 40 include a rectangular cross-section so that no rotational movement is allowed between the two, and the two are pined together at 41.

Figure 5:
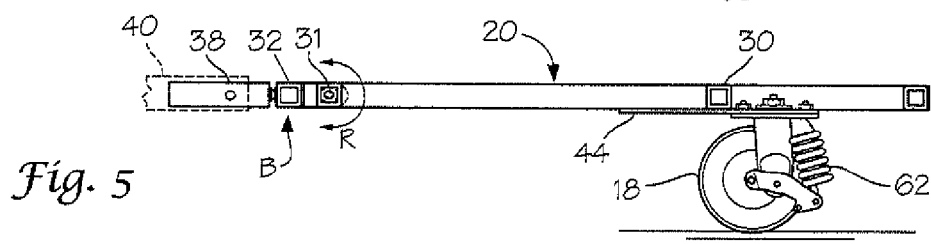
FIG. 5 is a side elevation illustrating the trailer bed in a horizontal or level position with the trailer hitch tongue in the vehicle hitch receiver.
Figure 6:
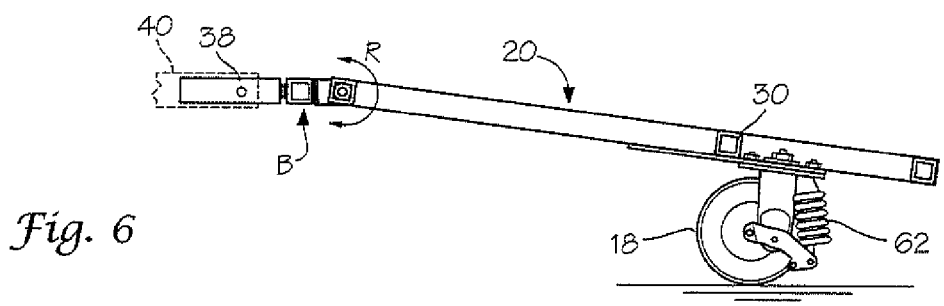
FIG. 6 illustrates the trailer wherein the bed of the trailer pivots relative to the cross-bar of the trailer hitch bar assembly.

As can best be seen in FIG. 2, pivot 31 provides rotation of the trailer about a pitch axis 58. Pivot 51 includes a pair of pivot arms 34a, 34b which are fixed at either end and pivotally attached at the other end. As illustrated, the arms are affixed to cross-bar 32 by means of two L-shaped legs 60 and 61 welded to cross-bar 32, and are pivotally attached to front frame member by pivot rod 31. In a typical manner, casters 16 and 18 rotate about horizontal and vertical axes. Preferably, a shock absorbing member 62 is located between the caster wheels and the trailer frame which, as can best be seen in FIGS. 5 and 6, may be suitable shock absorbing springs 60 and 62.

In operation, with trailer hitch tongue 38 inserted into vehicle receiver hitch 40 affixed to vehicle 10, the trailer may roll left and right about the roll axis provided by swivel connector 36. At the same time, the trailer may pitch up and down about pivot connector 31. Since no side to side motion (yaw) is permitted, the trailer mimics the rearward movement of the vehicle when backing up, and automatically tracks the movement of the vehicle.

Thus, it can be seen that a highly advantageous trailer and hitch assembly is provided which mimics the track of the vehicle. In this manner, the person backing the vehicle knows that the trailer is directly behind the vehicle and moving in the same track as the vehicle for use of rearward movement.

While a preferred embodiment of the invention has been described using specific terms, such description is for illustrative purposes only, and it is to be understood that changes and variations may be made without departing from the spirit or scope of the following claims.

The invention claimed is:

1. A trailer for towing by a vehicle which is easily maneuvered wherein the trailer tracks the vehicle when backing up so that the trailer may be utilized by an inexperienced driver, said trailer comprising:
    a trailer frame;
    a vehicle trailer hitch assembly including a pivotal cross-bar carried by said trailer frame, a trailer hitch tongue carried by said cross-bar adapted for insertion into a vehicle hitch receiver affixed to the vehicle;
    a front frame member of said trailer frame extending transversely to a longitudinal axis of said trailer;
    said cross-bar being pivotally carried by said front frame member in a manner to extend parallel to said front frame member and disposed between said frame member and said trailer hitch tongue;
    said trailer hitch tongue receivable in said vehicle hitch receiver when hitched to said vehicle in a manner that said hitch receiver and trailer hitch tongue are fixed against rotation relative to each other;
    a pivot connection disposed between said front frame member and said cross-bar providing rotation of said trailer about a pitch axis when hitched to the vehicle;
    a swivel connector disposed between said pivotal cross-bar and said trailer hitch tongue providing rotation of said trailer about a roll axis; and
    a pair of casters carried adjacent a rear portion of said trailer rotatable about horizontal and vertical axes;
    whereby said trailer frame may be hitched to said vehicle by means of said trailer hitch assembly of said trailer whereby the trailer and vehicle move in a same track.

2. The trailer of claim 1 wherein said hitch receiver and said hitch tongue have a rectangular cross-section.

3. The trailer of claim 2 wherein said cross-bar is tubular and said swivel connection includes a first connector member fixed with said cross-bar, a second connector member fixed with said trailer tongue, and a bearing carried between said first and second connector members.

4. The trailer of claim 1 including at least a second frame member carried adjacent a rear portion of said trailer frame extending transverse to said longitudinal trailer axis between first and second sides thereof.

5. The trailer of claim 4 wherein said casters are carried on opposing sides of said trailer frame adjacent said second frame member.

6. The trailer of claim 1 including a shock absorber carried between said casters and said trailer frame.

7. The trailer of claim 1 wherein said pivot connection includes a pivot arm connected between said pivotal cross-bar and said front frame member on opposite ends of said cross-bar, a first end of said pivot arm being pivotally attached to one of said front frame members and said cross-bar.

8. The trailer of claim 7 wherein a second end of said pivot arm is affixed to the other of said front frame members and said cross-bar.

9. A self-tracking trailer for towing by a vehicle which tracks the movement of the vehicle for ease of maneuvering comprising:
    a trailer frame having a front frame member extending generally across the front of said trailer frame transverse to a longitudinal axis of said trailer;

a vehicle trailer hitch assembly including a pivotal cross-bar carried by said front frame member;

a trailer hitch tongue carried perpendicular to said cross-bar adapted for insertion into a vehicle hitch receiver affixed to the vehicle when the trailer and vehicle are hitched;

said trailer hitch tongue receivable in said vehicle hitch receiver when hitched in a manner that said hitch receiver and trailer hitch tongue are fixed against rotational and longitudinal movement relative to each other;

said cross-bar being pivotally carried by said front frame member in a manner to extend parallel to said front frame member and disposed between said frame member and said trailer hitch tongue;

a pivot connection disposed between said front frame member and said cross-bar providing rotation of said trailer about a pitch axis when hitched to the vehicle;

a swivel connector disposed between said pivotal cross-bar and said vehicle providing relative rotation between said cross-bar and vehicle when hitched about a roll axis;

a plurality of casters carried by said trailer rotatable about horizontal and vertical axes; and said trailer may be hitched to said vehicle by means of said trailer hitch assembly so that the trailer and vehicle move in a same track.

10. The trailer of claim 9 wherein said hitch receiver and said hitch tongue have a rectangular cross-section preventing rotations there between.

11. The trailer of claim 10 wherein said swivel connection includes a first connector member and a second connector member, said first connector member being fixed to one of said pivotal cross-bar and vehicle hitch when hitched together, said second connector being carried by the other, and a swivel member bearing carried between said first and second connector members allowing at least one of the connector members to rotate relative to the other.

12. The trailer of claim 11 wherein said pivot connection includes pivot arms connected between said pivotal cross-bar and said front frame member, a first end of said pivot arms being pivotally attached to one of said front frame member and said cross-bar.

\* \* \* \* \*